US008047643B2

(12) United States Patent
Hindman et al.

(10) Patent No.: US 8,047,643 B2
(45) Date of Patent: Nov. 1, 2011

(54) TEMPERATURE SENSOR MOUNT FOR MELT PLATE

(75) Inventors: Larry Eugene Hindman, Woodburn, OR (US); Michael Alan Fairchild, Vancouver, WA (US)

(73) Assignee: Xerox Corporation, Norwalk, CT (US)

( * ) Notice: Subject to any disclaimer, the term of this patent is extended or adjusted under 35 U.S.C. 154(b) by 531 days.

(21) Appl. No.: 12/203,763

(22) Filed: Sep. 3, 2008

(65) Prior Publication Data

US 2010/0053281 A1 Mar. 4, 2010

(51) Int. Cl.

| | |
|---|---|
| ***B41J 2/175*** | (2006.01) |
| ***H05B 3/02*** | (2006.01) |
| ***B29C 65/00*** | (2006.01) |

(52) U.S. Cl. ............................ 347/88; 219/538; 156/60

(58) Field of Classification Search .................... 347/88; 219/538; 156/60

See application file for complete search history.

(56) References Cited

U.S. PATENT DOCUMENTS

| | | | | |
|---|---|---|---|---|
| 5,006,696 | A * | 4/1991 | Uchida et al. | 219/505 |
| 5,424,767 | A * | 6/1995 | Alavizadeh et al. | 347/17 |
| 6,452,476 | B1 * | 9/2002 | Handa | 338/22 R |
| 7,210,773 | B2 | 5/2007 | Jones | |
| 2006/0263501 | A1 * | 11/2006 | Oghafua et al. | 426/523 |
| 2007/0268348 | A1 | 11/2007 | Jones et al. | |

* cited by examiner

*Primary Examiner* — Geoffrey Mruk

(74) *Attorney, Agent, or Firm* — Maginot, Moore & Beck LLP

(57) ABSTRACT

A solid ink printer includes a melt plate configured to melt solid ink. A heater is connected to the melt plate in order to raise the temperature of the melt plate. The temperature of the melt plate is detected by a temperature sensor that is provided away from the surface of the melt plate but is configured to sense the temperature of the melt plate. A mount is positioned on the melt plate between the temperature sensor and the melt plate. The mount includes a mica layer and at least one polyimide film layer. The mount is arranged on the melt plate such that the mica layer of the mount may be adjacent to the melt plate and the polyimide film layer may be adjacent to the temperature sensor. A pressure sensitive adhesive may be used to connect the mount to the melt plate.

19 Claims, 3 Drawing Sheets

TEMPERATURE SENSOR MOUNT FOR MELT PLATE

TECHNICAL FIELD

The device and method described herein relate generally to heaters. More particularly, the device and method relate to temperature sensor use with heaters that melt solid ink to produce liquid ink for use within a printer.

BACKGROUND

Some printing systems utilize solid ink that is melted to provide liquid ink for imaging. The solid ink is loaded into the printer and advanced to a melting device which heats the solid ink to a melting temperature. The melted ink is collected and delivered to a printhead and the printhead ejects the melted ink onto media, directly or indirectly, to form an image. Typically, the melting device includes a melting surface that is warmed by a heater to melt the solid ink urged against the melting surface. The melting surface is oriented to enable the melted ink to drain away from the melting surface/solid ink interface. A drip plate receives the melted ink and directs it to a drip point from which the liquid ink drops into a reservoir or other collection vessel for delivery to the printhead. Such a printer is described in U.S. Patent Application US2007/0268348A1 issued to Jones et al. (hereinafter 'the '348 application'), the disclosure of which is expressly incorporated herein by reference in its entirety.

The temperature of the melt plate must be monitored in order to keep the temperature within a predetermined range. Melt plate temperatures below the predetermined range may indicate a heater that is not generating sufficient heat. Melt plate temperatures in excess of the predetermined range may indicate a heater that is generating too much heat. If the heater malfunctions and the temperature of the melt plate becomes excessive, damage may result to the material being melted, the heater, or other components. Therefore, a thermistor or other temperature sensing apparatus is typically attached to the melt plate. The thermistor senses the temperature of the melt plate and reports the temperature to a controller. When the controller determines that the temperature of the melt plate is above the desired range, the controller takes corrective action (e.g., reduce power to the heater, etc.).

To help protect the temperature sensing apparatus from damage, the primary voltage supplying the heater is isolated from the secondary voltage supplying the temperature sensing arrangement. A dielectric material is commonly used to perform this function of isolating the temperature sensing apparatus from the melt plate. In addition to providing electrical isolation between the melt plate and the temperature sensor, the dielectric material must also have the ability to respond quickly to melt plate temperature changes.

Most heater applications are similar to that described for melting solid ink in that a desired temperature window of operation. Safety, regulatory requirements and thermal control are all pertinent to operation, so details described for an ink melt device are generally applicable to a wide range of heater applications. Prior melt plate and temperature sensor arrangements included a thermistor that was directly soldered to the surface of the melt plate. In these arrangements, the melt plate itself was constructed of a material having good thermal conductivity and good dielectric qualities. One example of such a material is a polyimide film structure, such as a Kapton® laminate. These melt plates typically included a large restricted zone around the temperature sensor intended to isolate the primary voltage delivered to the melt plate from the secondary voltage delivered to the temperature sensor. Heater traces were prohibited in such restricted zones requiring the temperature sensor be physically offset from the most active portion of the heater. The restricted zones resulted in a large portion of unused space on the melt plate and also resulted in some degree of undesirable thermal lag.

In view of the above, it would be desirable to produce a melt plate that does not require a restricted zone. By not requiring a restricted zone, valuable area would be reclaimed on the melt plate, and heater traces could be placed throughout the melt plate. In addition, by not requiring a restricted zone on the melt plate, the thermal lag of the melt plate could be significantly reduced by moving the temperature sense closer to the most active portion of the heater. This reduction in thermal lag would, in turn, increase the power handling capabilities of the melt plate, allowing the melt plate to perform well and survive numerous cycles at increased power levels.

SUMMARY

A solid ink printer comprises a melt plate configured to melt solid ink. A heater is connected to the melt plate in order to raise the temperature of the melt plate. The temperature of the melt plate is detected by a temperature sensor that is provided away from the surface of the melt plate heater but is configured to sense the temperature of the melt plate so that the temperature can be controlled. A mount is positioned on the melt plate between the temperature sensor and the melt plate. The mount comprises a mica layer and at least one polyimide film layer. A pressure sensitive adhesive may be used to connect the mount to the melt plate.

In a heater implementation, the configuration includes a substrate, a heating element and a temperature sensor. The temperature sensor is mounted to the heater substrate with a mount comprising a mica layer and at least one polyimide layer. A pressure sensitive adhesive material may be used to connect the mount to the heater.

In at least one embodiment of the solid ink printer, the mount comprises two polyimide film layers. A first polyimide film layer may be positioned adjacent to the mica layer and a second polyimide film layer may be positioned between the first polyimide film layer and the temperature sensor. A pressure sensitive adhesive material may be used to connect the first polyimide layer and the second polyimide layer.

In at least one embodiment, the solid ink printer includes a controller operably connected to the temperature sensor and the heater. The controller is configured to adjust the power to the heater based on the temperature sensed by the temperature sensor.

The above described features and advantages, as well as others, will become more readily apparent to those of ordinary skill in the art by reference to the following detailed description and accompanying drawings. While it would be desirable to provide a temperature sensor mount for a melt plate that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

BRIEF DESCRIPTION OF THE DRAWINGS

Features of the integrally formed melt plate and drip plate will become apparent to those skilled in the art from the following description with reference to the drawings.

DETAILED DESCRIPTION

The word "printer", "printing device" or "printing system" as used herein encompasses any apparatus, such as, for example, a digital copier, bookmaking machine, facsimile machine, multi-function machine, etc., which performs a print outputting function for any purpose. The term "heater", "heater device", or "heating device" as used herein refers to any apparatus used to raise the temperature of another device, substrate, volume or surface, for any purpose. In various embodiments a heater may comprise a heating element (also referred to herein as a "heater element"), which may be, for example, a foil beater, silicone heater, wire wrap or adhered resistive layer, or any of various other heating elements. The heater device may also comprise a substrate that retains the heating element, and the substrate may comprise, for example, ceramic, steel, aluminum, plastic or mica. The application which will be described herein is for a heating device used to melt ink in a printer but it is to be understood that, in other embodiments, other heaters for other heating applications are anticipated.

Figure 1:
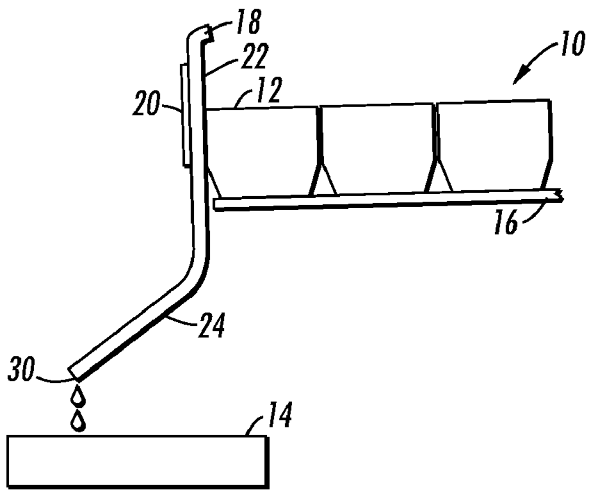
FIG. 1 is a side view of an ink loader for use in a solid ink printer comprising a melt plate and a heating device.

FIG. 1 is a plan view of a portion of an ink loader 10 for loading solid ink sticks 12 in a printer. The ink sticks 12 are urged through a chute 16 by a spring-biased pusher (not shown) to a melt plate 18, which melts the ink sticks 12 and conveys the melted ink to a reservoir in a print head 14. The melt plate 18 includes an upper portion 22 which includes a melting surface that contacts the ink sticks 12. The melt plate 18 also includes a lower portion 24 which provides a converging drip region that delivers ink to the print head reservoir 14. A heater 20 is secured to a side of the melt plate 18 that is opposite the melting surface. Molten ink exits the melt plate in a region typically called a drip point 30, where ink may drip or flow.

Figure 2:
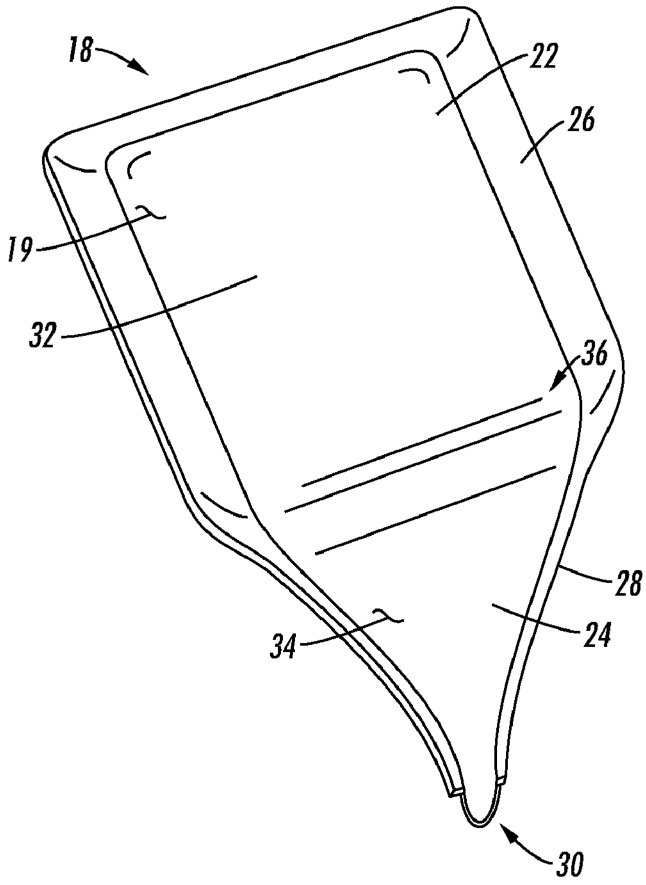
FIG. 2 is a perspective view of the melt plate of FIG. 1.

The melt plate 18 is shown in greater detail in FIG. 2. The melt plate includes an ink side 19 and an opposing heater side 21 (see in FIG. 3). The melt plate includes a curved transition boundary 36 between the upper portion 22 and the lower portion 24. A first rim 26 extends around the upper portion 22, except along a transition boundary 36. A second rim 28 extends around the lower portion 24, except along the transition boundary 36 and the drip point 30. The rims 26 and 28 help prevent the melted ink from flowing over the plate 18 at locations other than the drip point 30. The drip point 30 is provided at ends of the second rim 28 that define an opening in the plate 18 through which melted ink exits the plate 18 to advance to the print head 14.

Figure 3:
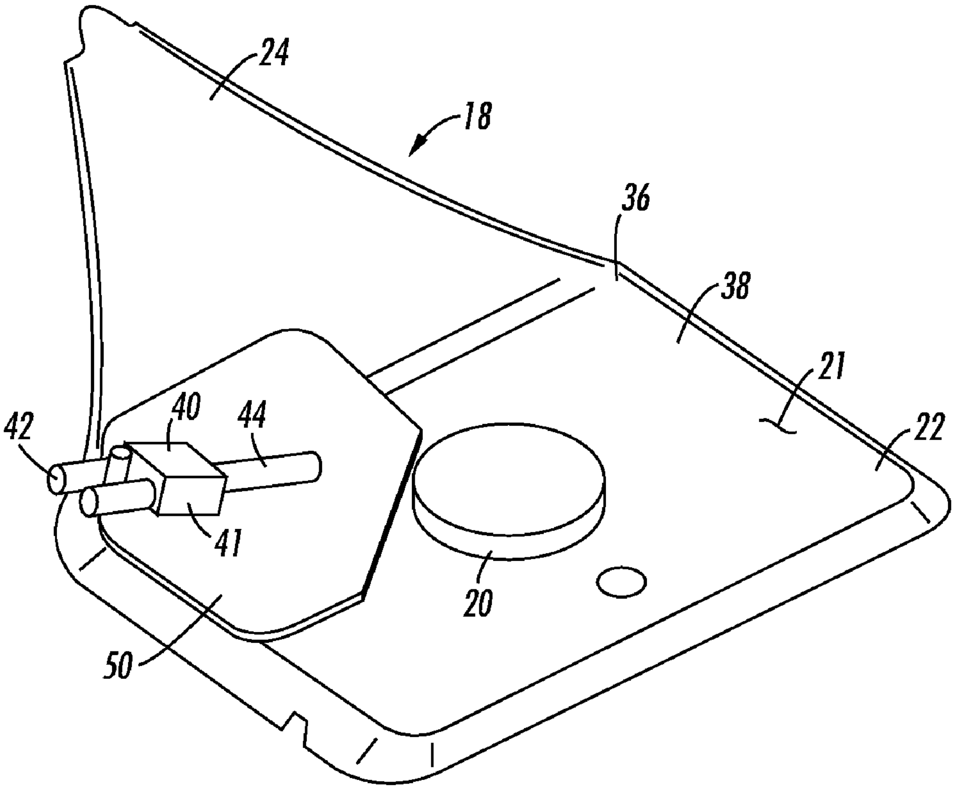
FIG. 3 is a perspective view of an opposite side of the melt plate of FIG. 2 showing a temperature sensor and a mount connected to the melt plate.

Referring now to FIG. 3, the heater side 21 of the melt plate 18 is shown. The heater side 21 of the melt plate 18 includes a surface 38 which is on the opposite side the melt plate from the melting surface 32 (see FIG. 2). The heater 20 is secured to this surface 38 on the melt plate 18. The heater may take the form of electrical traces (not shown) and may be embedded in or bonded on the melt plate 18. The heater element may partially or fully extend over the upper melt portion and may partially or fully extend to the lower drip portion as required by the application. When electrical power is provided to the heater 20, electric current is delivered to the traces. Electric current flowing through the traces heats the melt plate 18. The heating element 20 may be in a form other than traces, such as larger area coatings or sputtered resist material but for simplicity, the term traces will be used for all configurations. Heating elements may be placed on more than one section or side of a heating device and may be connected (single circuit) or may be independent (multiple circuits).

A temperature sensor 40 is provided near the melt portion of the plate 18 in order to sense the temperature of the melt plate. In at least one embodiment, the temperature sensor 40 is provided in the form of a thermistor which is positioned off the surface 38 of the melt plate 18. In particular, as shown in FIG. 3, the thermistor 40 is connected to a mount 50, and the mount 50 is positioned on the surface 38 of the melt plate 18. A thermally conductive spring arm 44 extends between the thermistor 40 and the mount 50 in order to connect the thermistor 40 to the mount. A thermistor body 41 may be securely mounted to a stationary casing or housing member (not shown). When the thermistor body 41 is mounted, the resilient spring arm 44 is bent such that the end of the spring arm 44 presses against the surface of the mount 50. The force of the spring arm 44 against the mount 50 enables a thermal connection between the mount and the thermistor 40. An electrical potential is provided to the thermistor 44 via leads 42. As the temperature of the melt plate 18 changes, the temperature of the mount 50 also changes. The spring arm 44 conducts heat from the mount to the thermistor 44. As the temperature at the thermistor 44 changes, the resistance of the thermistor 40 also changes. Thus, the temperature of the melt plate 18 may be monitored based on the detected electrical resistance of the thermistor 40. In another implementation, the sensor 40 may be bonded or otherwise affixed to the mount 50 and the mount 50 may be bonded to the heater such that a spring may not be required.

The mount 50 which connects the thermistor 40 to the melt plate 18 (via the spring arm 44) is a multi-layered dielectric structure designed to provide a rapid thermal response to changing temperature while also isolating the thermistor from the voltage supplied to the heater. The mount 50 is provided in the form of a coupon attached to the surface of the melt plate 18. In the embodiment of FIG. 3, the mount 50 is connected to the melt plate 18 using a pressure sensitive adhesive material. The thermistor 40 is connected to the melt plate using an adhesive material. However, it will be recognized that other means of securing the mount 50 to the melt plate 18 or the thermistor 40 to the mount 50 are possible. For example, fasteners, such as rivets or bolts may be used to secure the thermistor 40 to the mount 50.

Figure 4:
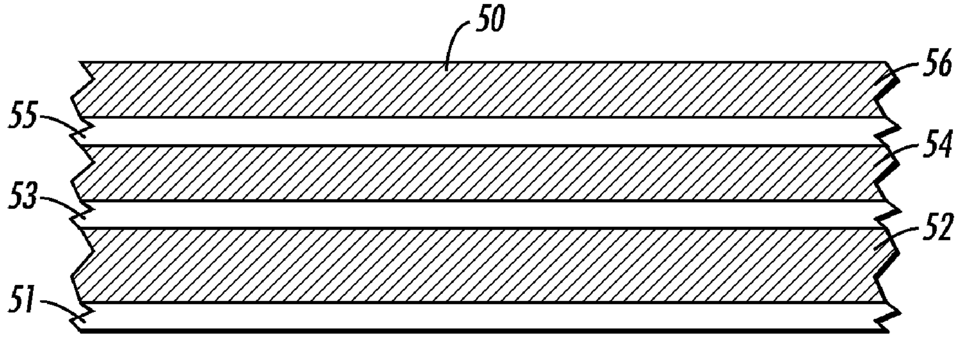
FIG. 4 is a cross-sectional view of the mount of FIG. 3.

With reference now to FIG. 4, a cross-sectional view of the mount 50 is shown. As can be seen from FIG. 4, the mount is a laminate construction that comprises multiple layers of various materials. In particular, the mount comprises a layer of mica 52 and two layers of a polyimide film 54, 56. In a preferred embodiment, a first layer of adhesive material 51 is provided adjacent to the mica layer 52 and is used to secure the mount 50 to the melt plate 18. A second layer of adhesive material 53 is provided between the mica layer 52 and the first polyimide film layer 54 in order to secure the mica layer 52 to the first polyimide film layer 54. A third layer of adhesive material 55 is provided between the first polyimide film layer 54 and the second polyimide film layer 56 in order to secure the first polyimide film layer 54 to the second polyimide film layer 56. Depending on the heater element type, heat range and heater purpose, the mica and dielectric layering may be in a different arrangement. The term mica is intended to encompass all of the sheet phyllosilicate materials and similar silicate compositions.

The adhesive layers 51, 53 and 55 may be provided using any of various commercially available adhesives. For example, a pressure sensitive adhesive (PSA) tape, such as the 966 PSA tape offered by 3M, may be used for the adhesive layers 51, 53, and 55. A material such as the 966 PSA tape allows the adhesive layers to be provided as a flexible and relatively thin material. In at least one embodiment, each of the adhesive layers has a thickness of about 0.05 mm.

The mica layer 52 may be provided using any of several commercially available mica materials. For example, the mica layer 52 may be provided using the FIROX™ P COGEMICA™ glass backed cable tape offered by Cogebi, Inc. The FIROX material comprises a mica paper bonded to an electrical grade glass cloth impregnated with a high temperature resistant silicon elastomer. The mica layer 52 is flexible and has a very high temperature resistance and is also flame-resistant. Furthermore the mica layer 52 exhibits sufficient cohesive strength to allow the mount to be peeled from a release layer. In particular, when the 966 PSA tape is applied to the mica layer, the mount may be provided as a unitary self-adhesive member. This allows the mount 50 to be easily secured to the melt plate 18 during assembly of a printer. In at least one embodiment, the thickness of the mica layer is about 0.12 mm. Another benefit of mica, particularly when placed adjacent the heater element, is that it tends to mitigate damage between heater traces in the event of an over temperature condition, excessive supply voltage condition or other atypical condition. This benefit suggests use of larger sections or even full coverage of the beater element with a mica layer. The sensor mount 50 may be configured accordingly. Alternatively or in addition to such a mount, a heater element may be partially or fully covered with the mica layer even if that layer is not also used to mount a sensor.

The polyimide film layers 54, 56 may be provided using any of several commercially available polyimide materials. For example, the polyimide film layers 54, 56 may be provided using KAPTON® polyimide film, which is available from DuPont. In at least one embodiment the KAPTON® 200HN product is used as the polyimide film. The KAPTON® polyimide film provides a material with a high dielectric strength, which allows the mount 50 to be provided with a relatively thin construction. In addition, the KAPTON® polyimide film is flexible, non-flammable, and has good thermal conductivity. In at least one embodiment, the thickness of each polyimide film layer is about 0.05 mm. Materials other than mica and polyimide may be used to achieve the intended heater and sensor performance benefits described provided the insulation benefits of mica and the high dielectric strength of polyimide is obtained.

When the multiple layers of the mount 50 are assembled, the resulting structure is a flexible coupon that can be easily adhered to the melt plate 18. Because of the flexible construction of the mount 50, the mount conforms to moderate undulations on the melt plate 18. For example, the mount 50 may be applied at the curved transition boundary 36 of the melt plate 18 such that the mount spans between the upper portion 22 and lower portion 24 of the melt plate 18.

As disclosed herein, the assembled mount 50 may be used to connect a temperature sensor 40 to a melt plate 18. To accomplish this, any hacking is first peeled away from adhesive layer 51 (see FIG. 4). The mica layer 52 of the mount 50 is then attached to the melt plate using the adhesive layer 51. Thereafter, the temperature sensor 40 is attached to the second polyimide film layer 56.

The structure of the mount 50 is such that it provides an isolating dielectric member with good thermal conductivity. Thus, the mount 50 allows the temperature sensor 40 to be placed very close to the meltzone, i.e., the heated regions of the melt plate 18. This means that the melt plate 18 can be constructed without the need to reserve a large unheated area on the melt plate 18 for the temperature sensor. This also means that the thermal lag of the temperature sensor may be reduced In addition to the above, the structure of the mount 50 results in improved power handling capabilities for certain melt plate embodiments. For example, the structure of the mount is such that the bottom dielectric of the melt plate (i.e., a dielectric that separates the traces from the aluminum substrate) may be constructed with a focus on thermal performance more than electrical requirements. This may allow the melt plate to be thinner, thus reducing the amount of material required for the melt plate and also reducing the thermal resistance across the plate. This reduced thermal resistance in turn offers faster response time, improved thermal control and increases the power handling capability of the melt plate, which increases the safety and reliability of the product in which the mount is placed.

Figure 5:
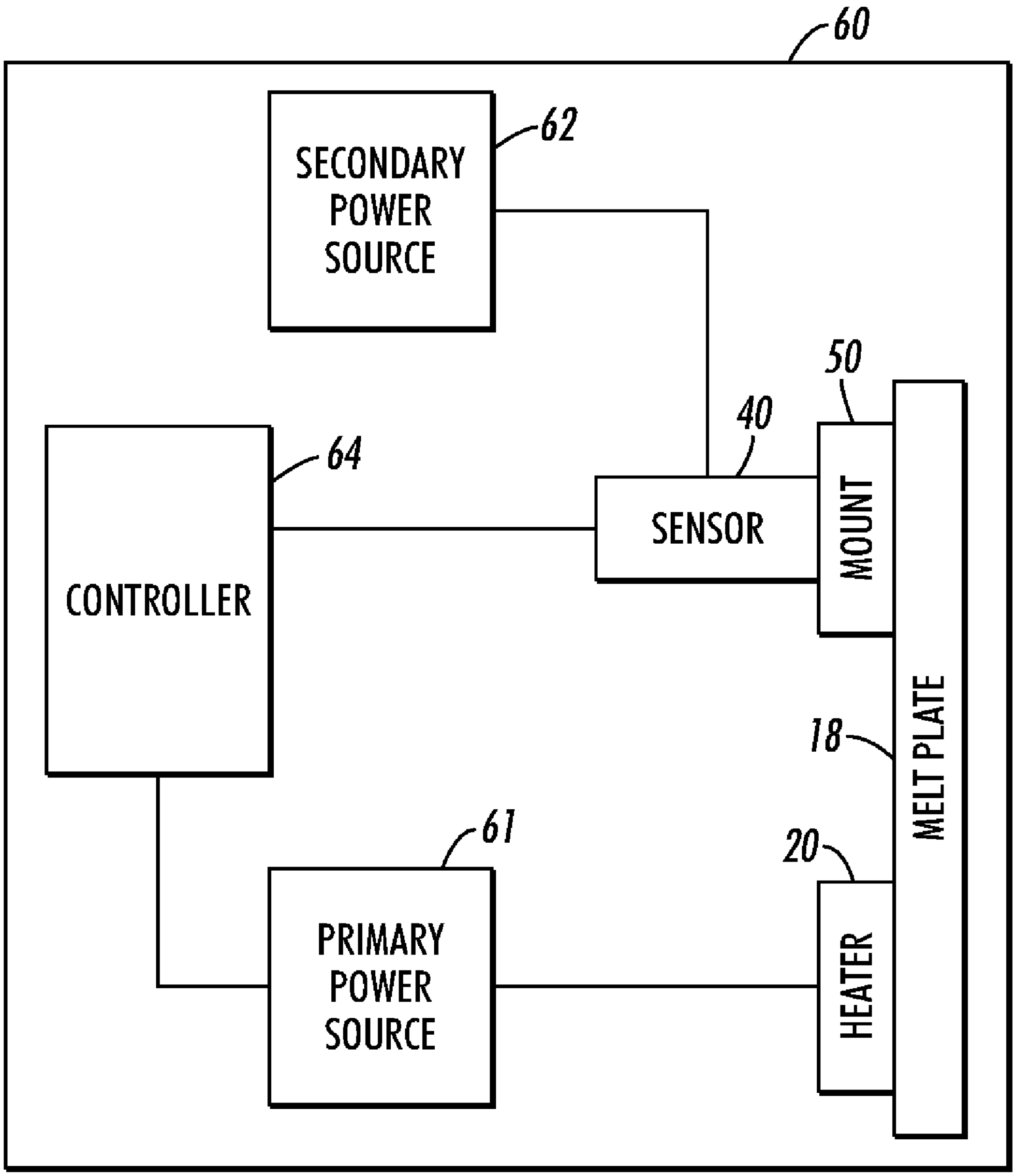
FIG. 5 is a block diagram of a printer including a temperature sensing apparatus connected to the melt plate of FIG. 3.

With reference now to FIG. 5, a block diagram of a printer 60 with a temperature sensing apparatus is shown. The temperature sensing apparatus comprises a heated surface such as a melt plate 18. A heater 20 is attached to the melt plate 18. The heater is supplied with power from a primary power source 61. A temperature sensor 40 is also attached to the melt plate 18 using a mount 50. The mount 50 is comprised of a mica layer and a plurality of polyimide film layers. A voltage is supplied to the temperature sensor 40 using a secondary power source 62. A controller 64 monitors a signal from the temperature sensor 40 to determine whether the temperature of the melt plate 18 is within a predetermined range. Should the temperature of the melt plate 18 exceed the predetermined range, the controller is configured to adjust the heat provided by the heater 20. For example, the controller 64 may act to reduce the power delivered to the heater 20 from the primary power source 61, thus reducing the output of the heater 20 and reducing the temperature of the melt plate 18.

Although the various embodiments have been described herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A solid ink melt device comprising:

a melt plate configured to melt solid ink;

a temperature sensor configured to sense the temperature of the melt plate; and a mount positioned on the melt plate and configured to operably connect the temperature sensor to the melt plate, the mount comprising a mica layer, a first polyimide layer, and a second polyimide layer, the first polyimide layer being positioned adjacent to the second polyimide layer.

2. The solid ink melt device of claim 1 wherein the mica layer is positioned adjacent to the melt plate and the second polyimide layer being positioned adjacent to the temperature sensor.

3. The solid ink melt device of claim 1 wherein a pressure sensitive adhesive is used to operably connect the mount to the melt plate.

4. The solid ink melt device of claim 1 further comprising:

a pressure sensitive adhesive that connects the first polyimide layer to the second polyimide layer.

5. The solid ink melt device of claim 1 further comprising:

a heater configured to provide heat to the melt plate, and a controller operably connected to the temperature sensor, the controller configured to adjust electrical power provided to the heater based on the temperature sensed by the temperature sensor.

6. The solid ink melt device of claim 1 wherein the temperature sensor comprises a thermistor.

7. The solid ink melt device of claim 1 wherein the temperature sensor is removed from the surface of the melt plate and is connected to the mount via a spring arm.

8. A method of mounting a temperature sensor to a melt plate in a solid ink printer, the method comprising:

providing a flexible mount member comprising a mica layer, a first polyimide layer, and a second polyimide film layer, the first polyimide layer being positioned adjacent to the second polyimide layer;

operably connecting the mica layer of the mount member to the melt plate; and operably connecting the temperature sensor to the second polyimide film layer.

9. The method of claim 8 wherein the mica layer is attached to the melt plate using a pressure sensitive adhesive.

10. The method of claim 8 wherein the temperature sensor is attached to the second polyimide film layer using a pressure sensitive adhesive.

11. The method of claim 8, the mount member further comprising:

a plurality of polyimide film layers that include the first polyimide film layer and the second polyimide film layer, the first polyimide film layer being positioned between the mica layer and the second polyimide film layer.

12. The method of claim 8, the mount member further comprising:

a first pressure sensitive adhesive material positioned between the mica layer and the first polyimide film layer; and a second adhesive material between the first polyimide film layer and the second polyimide film layer.

13. The method of claim 8, the flexible mount member further comprising:

a spring arm that operably connects the temperature sensor to the second polyimide film layer.

14. A heater device comprising:

a substrate;

a heating element provided on the device substrate;

a mica layer provided on at least a portion of the heating element;

a first polyimide layer operably connected to at least a portion of the mica layer;

a second polyimide layer operably connected to the first polyimide layer; and a temperature sensor operably connected to the second polyimide layer.

15. The heater device of claim 14 further comprising:

a plurality of polyimide film layers that include the first polyimide film layer and the second polyimide film layer, the first polyimide film layer being positioned between the mica layer and the second polyimide film layer.

16. The heater device of claim 15 further comprising:

a first pressure sensitive adhesive material positioned between the mica layer and the first polyimide film layer; and a second adhesive material positioned between the first polyimide film layer and the second polyimide film layer.

17. The heater device of claim 14 wherein the mica layer and the polyimide film layer are each less than or about 0.15 mm thick.

18. The heater device of claim 14 wherein the mica layer extends over at least a substantial portion of the heater element.

19. The heater device of claim 14 further comprising:

a spring arm that operably connects the temperature sensor to the second polyimide layer.

* * * * *